Sept. 29, 1970  C. THUMIM ET AL  3,530,975
INPUT FEED MECHANISM FOR TRIMMER
Original Filed March 10, 1966  6 Sheets-Sheet 1
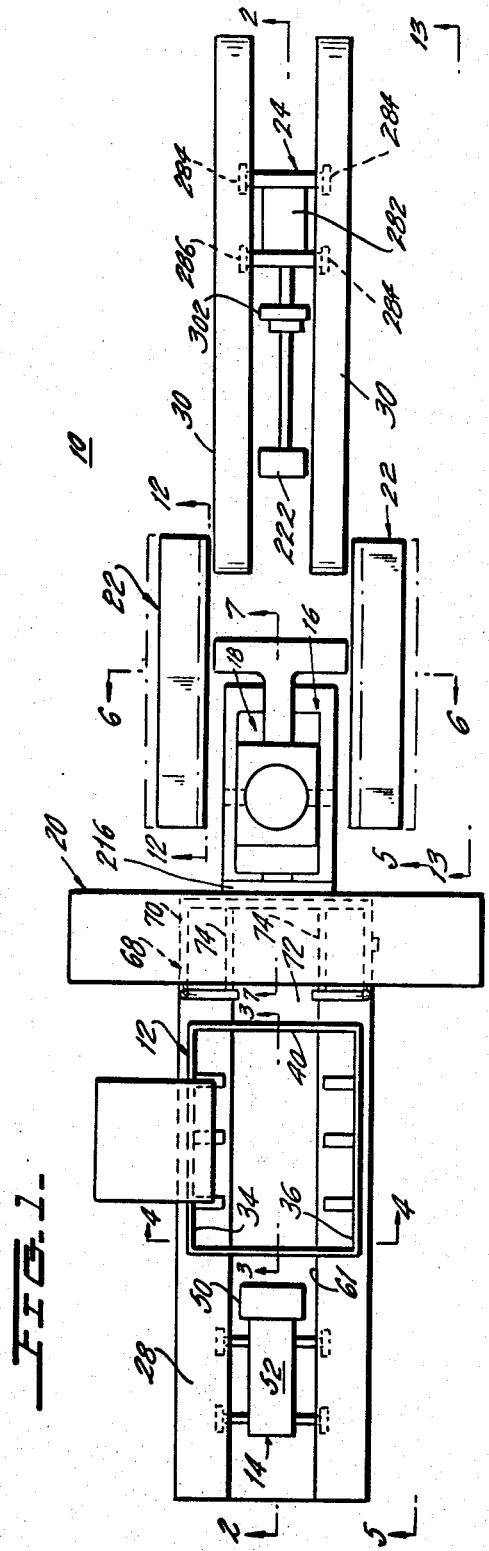
INVENTORS
CARL THUMIM
NICHOLAS HERMAN
JAMES DES JARDINS
OSTROLENK, FABER, GERB & SOFFEN
ATTORNEYS

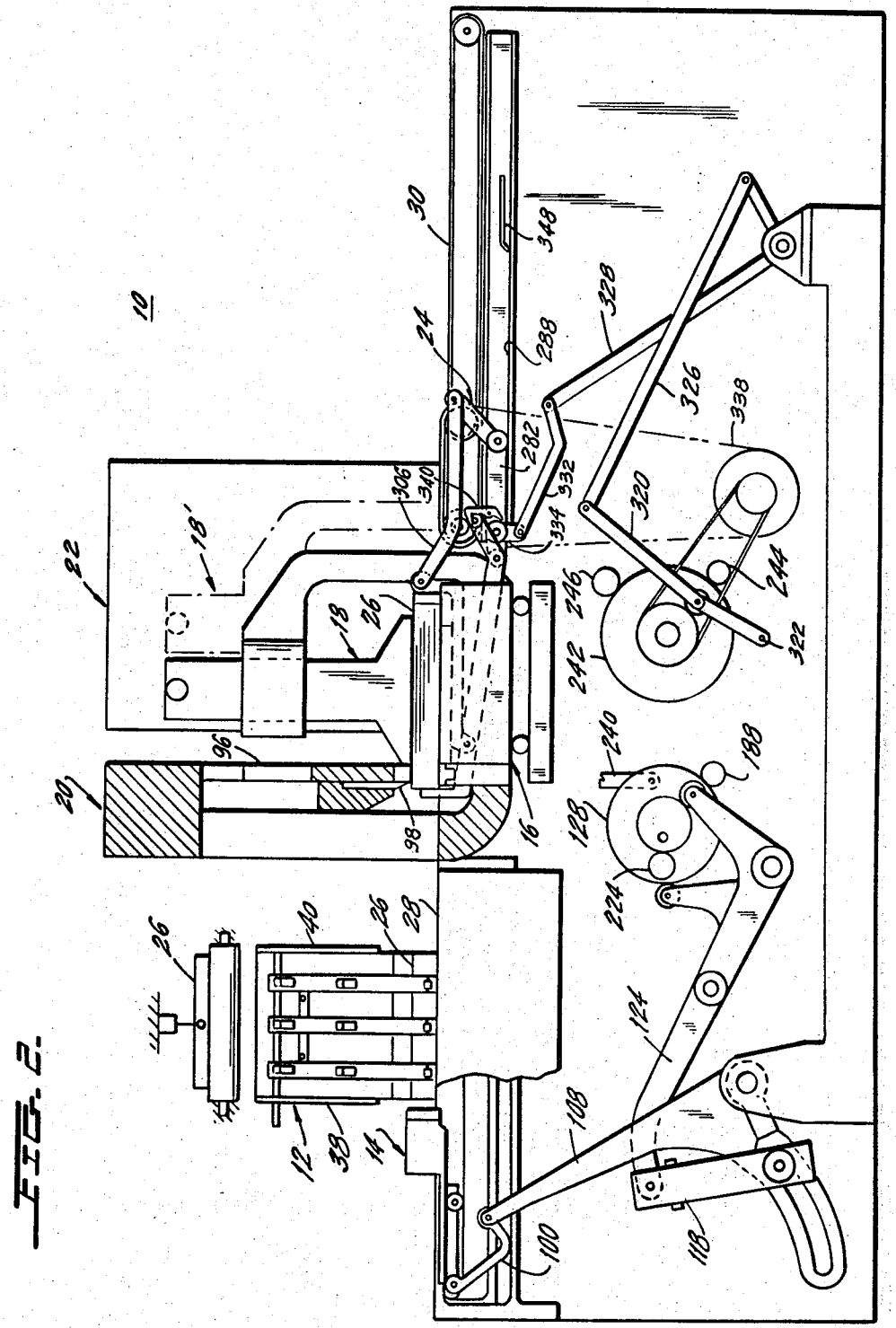

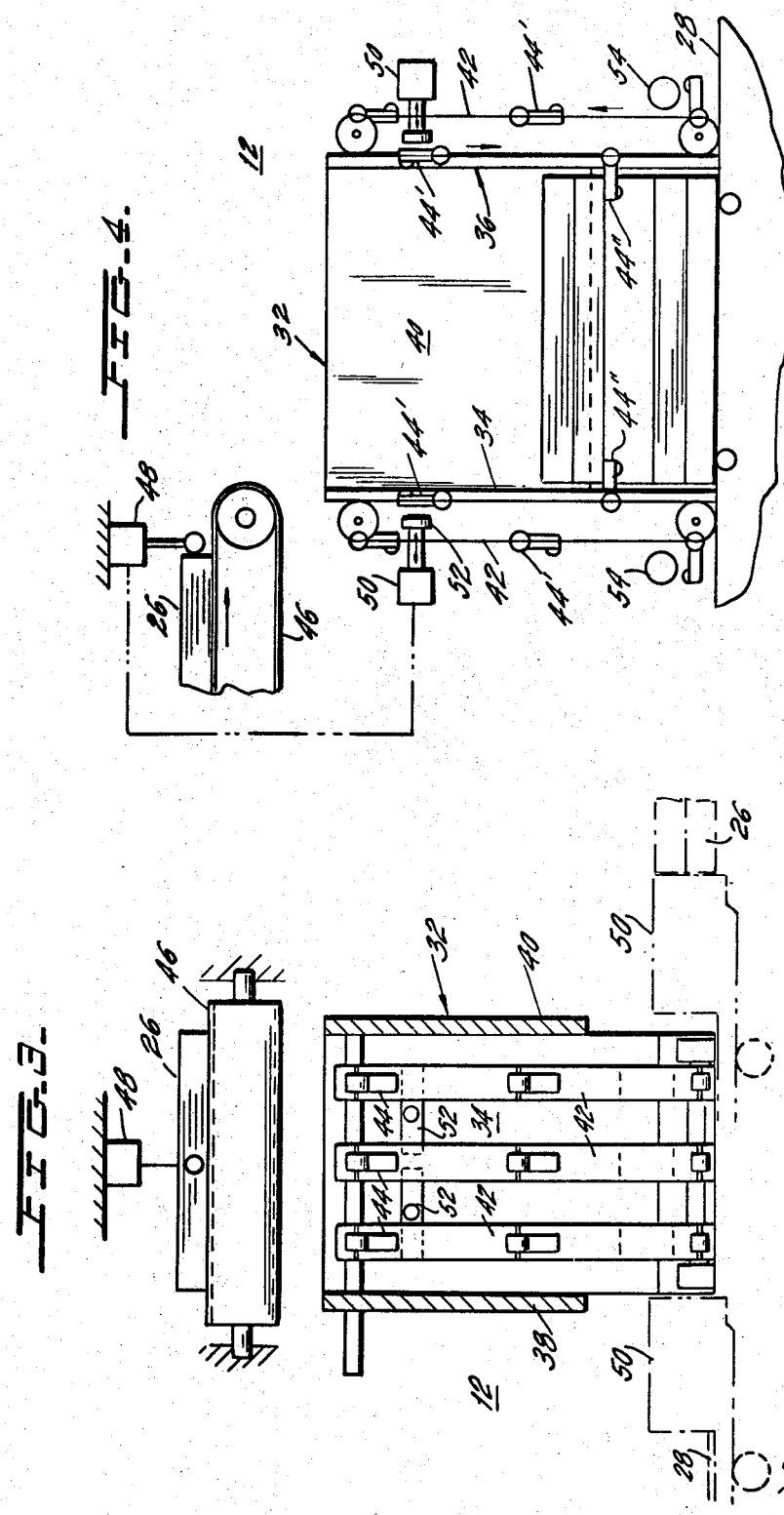

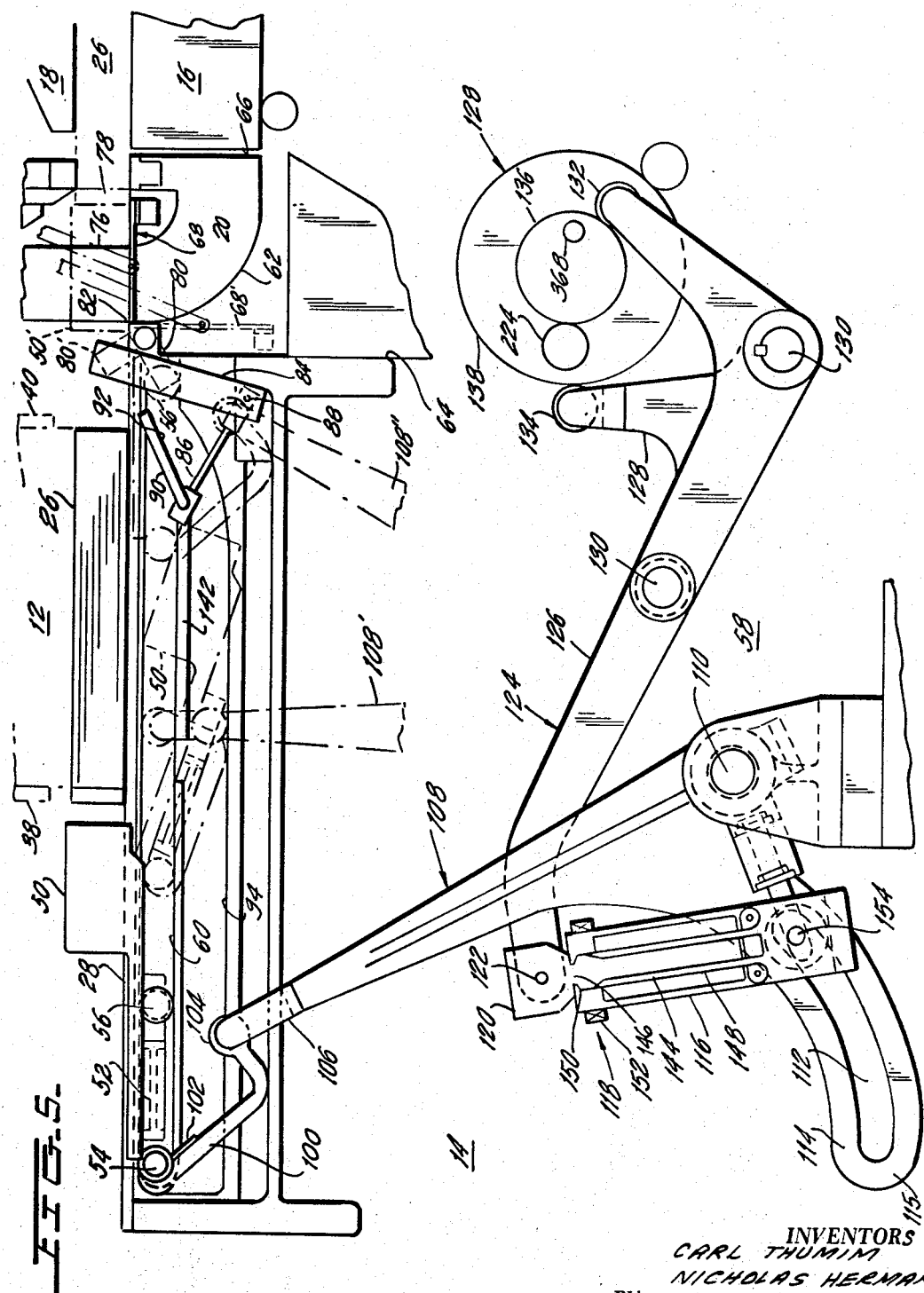

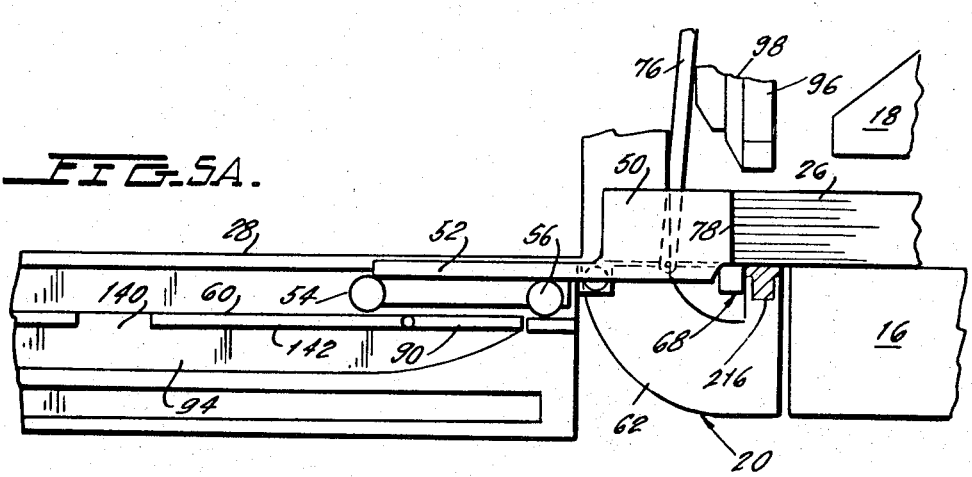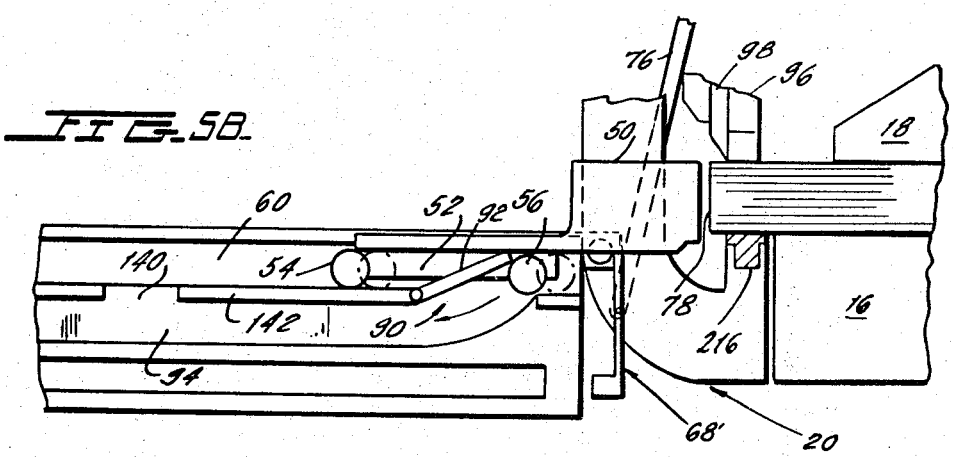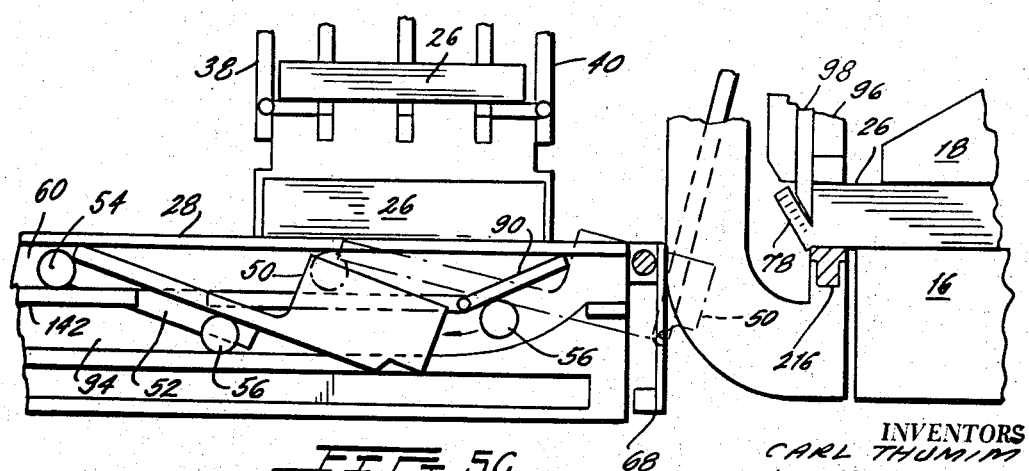

Sept. 29, 1970  C. THUMIM ET AL  3,530,975
INPUT FEED MECHANISM FOR TRIMMER
Original Filed March 10, 1966  6 Sheets-Sheet 6
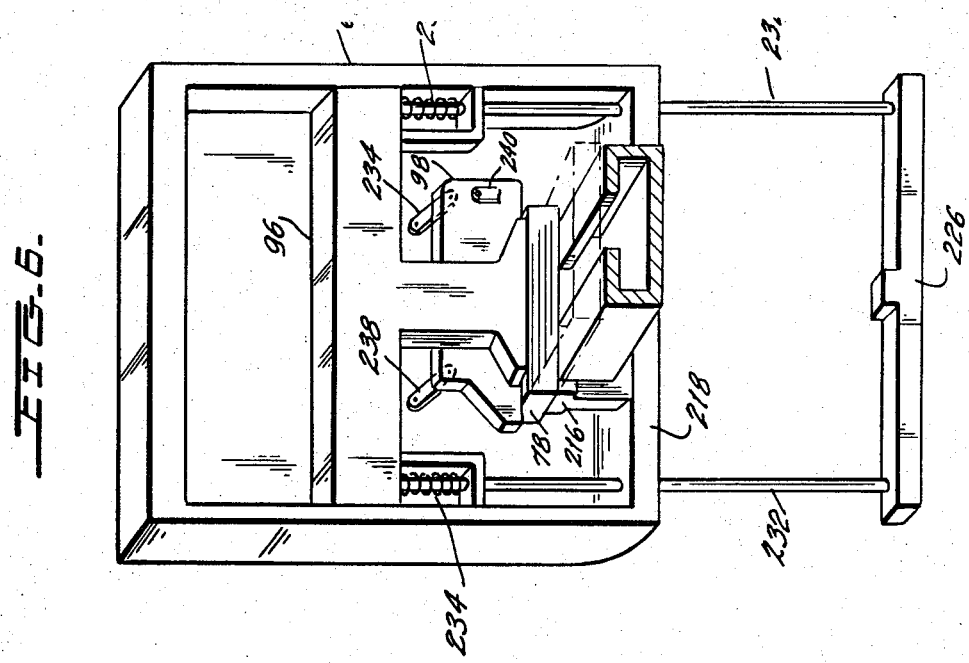
INVENTORS
CARL THUMIM
NICHOLAS HERMAN
BY JAMES DES JARDINS
OSTROLENK, FABER, GERB & SOFFEN
ATTORNEYS

United States Patent Office 3,530,975
Patented Sept. 29, 1970

3,530,975
INPUT FEED MECHANISM FOR TRIMMER
Carl Thumim, Chicago, Nicholas Herman, Palatine, and James Des Jardins, Chicago, Ill., assignors to Miehle-Goss-Dexter, Incorporated, Chicago, Ill., a corporation of Delaware
Original application Mar. 10, 1966, Ser. No. 533,328, now Patent No. 3,424,044. Divided and this application June 13, 1968, Ser. No. 775,211
Int. Cl. B65g 25/08
U.S. Cl. 198—222                                  13 Claims

ABSTRACT OF THE DISCLOSURE

Input feed mechanism for continuous trimmer, including a pusher for moving items to be trimmed to a work location; the pusher being secured to a trolley which rides along a track; the track includes a switch that permits the pusher to engage items to be moved during the push stroke and that causes the trolley and the pusher to dip beneath the next stack of items to be pushed during the return stroke; drive means for the trolley, including a release device for releasing the trolley from the drive means when a jam up of items being pushed occurs.

---

This is a division of application Ser. No. 533,328, filed Mar. 10, 1966, now Pat. No. 3,424,044.

This invention relates to cutting apparatus and more particularly relates to an input feed mechanism for a continuous three-knife trimmer which is capable of accurately trimming three edges of a book or other similarly stacked paper material at an extremely high rate of speed.

The paper cutting and trimming industry has long felt the need for a continuous high-speed trimmer capable of accurately tirmming three edges of a book, magazine or other similarly stacked paper material such that the output from such machine or trimmer requires no further trimming and can be forward to the final steps of manufacture which might include gluing, binding, etc. The instant invention provides an input feed mechanism for such a high-speed continuous three-knife trimmer which is fully automatic, highly accurate, and capable of trimming three sides of a book, stack of books, or paper at rates as high as or better than 100 units per minute.

Basically the mechanism of the instant invention is used in conjunction with a three-knife trimmer which may be said to include eight sub-assemblies, classified as follows: (1) stacking mechanism for depositing a predetermined quantity of material at the input side of the machine; (2) input feed mechanism for delivering the quantity of material deposited by the stacking mechanism onto a movable table located in the cutting area of the machine; (3) stop mechanism for accurately positioning the material on the table; (4) a transportable clamp mechanism for securely clamping the deposited material onto the table; (5) a front knife assembly for trimming trailing edge of the material clamped on the table by the transportable clamp mechanism; (6) table operating mechanism for moving the table between its first postion in which the material is originally stacked thereon, and a second position a predetermined distance to the rear of the machine whereby side knife assemblies may cut the sides of the material without interfering with the front knife assembly; (7) side knife assemblies for trimming the sides of the material once the table has moved to its second position; and (8) delivery mechanism for withdrawing the material from the cutting area of the machine to the output thereof whereby the material is now completely trimmed and ready to be passed on to the next step of manufacture.

The input feed mechanism includes a pusher or transport means, which travels above the work surface on which items to be fed have been stacked by the stacking mechanism that is the subject of application Ser. No. 775,209, filed June 13, 1968, also a division of application Ser. No. 533,328, now Pat. No. 3,424,044 and which travels through an item containing enclosure of the stacking mechanism to feed a predetermined quantity of material which is on the work surface to a second position on the aforementioned work table which, at present, is occupying its first position.

As soon as the pusher or transport means is through the containing enclosure of the stacking mechanism and as it continues its path of travel to feed the material onto the work table, the cycle speed chosen for the entire apparatus and at which speed the endless belts of the stacking mechanism are operating, assures that the next quantity of material is immediately deposited upon the work surface.

In order to prevent interference between the transport means or pusher and the subsequently deposited quantity of material, the input feed mechanism is provided with automatic guide means by which the pusher is returned to its original or starting position in a path of movement which is beneath the work surface. Thus the stacking mechanism can deposit the next quantity of material to be cut on the work surface without waiting for the pusher to return to its original or starting position, and thus the above described cooperation between the stacking mechanism and input feed mechaism eliminates one possible delay in the overall operation of the machine and thereby increases the rate of operating speed thereof.

As a further feature of the input feed mechanism, the operating mechanism therefor includes releaseable latching means normally rigidly connected between the driving source of power therefor and the transport means which pushes the material or book into the cutting area of the machine. If, by chance, a book or books should become jammed, the latching mechanism releases to provide a slip feature to relieve the pressure of the driving mechanism on the pusher and thereby prevent damage to the input feed mechanism.

The pusher or transport means feeds the book through the aforementioned front knife assembly and onto the movable work table, which at this instant occupies its first position which is spaced from the edge of the work surface upon which the book was originally deposited by a distance corresponding to the thickness of the front knife assembly. In order to feed the book through the front knife assembly and yet still permit such assembly to perform its function of cutting the trailing edge of the book deposited on the work table, there is provided on the edge of the work surface which abuts the front knife assembly, a pivoting bridge capable of occupying two positions. The first position is an up position in which the bridge extends through the front knife assembly and bridges the gap between the edge of the work surface and the movable table. Thus, as the pusher feeds the book onto the table the book is prevented from falling through the space between the work table and work surface.

Once the book has reached its final position on the work table, as determined by the stop mechanism, and the aforementioned transport clamp and front knife assembly begin to operate, the bridge is pivoted to a down position out of the way of the front knife assembly so that such front knife assembly may non-interferingly cut the trailing edge of the book now clamped in place on the table by the transportable clamp.

As the bridge is pivoted to its down position the pusher of the input feed mechanism has reached its furthest point of travel and the downwardly pivoting bridge actuates the aforementioned guide means to establish the return path of movement for the pusher, which as noted before is beneath the work surface upon which the next book is being deposited by the stacking mechanism.

Accordingly, it is an object of the instant invention to provide a continuous three-knife trimmer which is comprised of a plurality of sub-assemblies which operate at cycle speed to effect high-speed assembly-line trimming of up to three edges of a book, magazine or other similarly stacked material.

Yet another object of the instant invention is to provide a continuous three-knife trimmer wherein the stacking mechanism work surface and input feed mechanism co-operate in such a manner as to permit a subsequent quantity of material to be deposited on the work surface before the pusher or transport means of the input feed mechanism returns to its starting position.

Still another object of the instant invention is to provide such a continuous three-knife trimmer wherein the input feed mechanism thereof includes releasable latching means for disconnecting the operating source of power from the pushing transport means in the event of jamming of books in the machine.

Still another object of the instant invention is to provide a continuous three-knife trimmer which includes a front knife assembly positioned between the work surface and a material-receiving movable table spaced therefrom, and wherein there is provided pivoting bridge means for bridging the gap between said work surface and work table when the input feed mechanism is depositing the predetermined quantity of material through the front knife assembly and onto the whole table.

Still another object of the instant invention is to provide such a continuous three-knife trimmer which is interrelated through a geared driving mechanism driven by a single source of power so as to assure synchronized operation of the entire apparatus and thereby increase the capability thereof.

Other objects and a fuller understanding of the invention may be had by referring to the following description and drawings, in which:

FIG. 1 is a plan view of the continuous three-knife trimmer of the instant invention;

FIG. 2 is a side view, partially in section, taken along the arrows 2—2 of FIG. 1;

FIG. 3 is a sectional view of the stacking mechanism shown in FIG. 1, taken along the arrows 3—3 thereof;

FIG. 4 is a detailed view of the stacking mechanism of FIG. 1 and taken along the arrows 4—4 thereof;

FIG. 5 is a detailed view of the input feed mechanism of FIG. 1 and taken along the arrows 5—5 thereof;

FIGS. 5a, 5b and 5c are detailed sequential operating views of the input feed mechanism of FIG. 5; and FIG. 6 is a perspective view of the front knife assembly and work table shown in FIG. 1 and taken along the arrows 6—6 thereof.

Referring to FIGS. 1 and 2, there is shown a continuous three-knife trimmer 10 constructed in accordance with the teachings of the instant invention. As has been previously noted, the three-knife trimmer 10 is capable of rapidly and accurately trimming up to three edges of a book, magazine or other similarly stacked paper material in a fully automatic, continuous operation. For case of identification and nomenclature, throughout the remainder of this specification, the material to be trimmed by the instant invention be hereinafter referred to as a book, although it is to be understood that the instant invention is equally applicable to a stack of books, a magazine or stack of magazines, or any other similarly stacked quantity of paper material capable of being trimmed in a guillotine fashion.

The trimmer of FIGS. 1 and 2 may be conveniently broken down into eight sub-assemblies, which were briefly outlined above. They include a stacking mechanism generally indicated at 12; an input feed mechanism 14; a movable work table 16; a transportable clamp 18; stop mechanism 19 (not shown); a front knife assembly 20; two side knife assemblies 22; and a delivery mechanism generally indicated by the reference character 24. The operation of the input feed mechanism 14 for the three-knife trimmer 10 may be briefly summarized as follows:

A book 26 is initially fed into stacking mechanism 12 whereby it is deposited upon the slotted work surface 28 therebelow. Input feed mechanism 14 pushes the book 26 through the front knife assembly 20, against back stop (not shown) and onto the movable table 16 initially occupying the solid line position shown in FIG. 2. Then the book is clamped, trimmed, unclamped and delivered from the trimmer.

STACKING MECHANISM

Referring to FIGS. 3 and 4, the stacking mechanism 12 is seen to comprise a containing enclosure 32 which includes two pairs of oppositely disposed walls 34, 36 and 38, 40, respectively. Walls 34 and 36 each comprise a plurality of a closed loop endless belt 42 upon which are pivotally mounted a plurality of projecting fingers 44.

Books 26 are transported to a position above the enclosure 32 by means of conveyor belt 46 and are dumped into the containing enclosure or hopper 32 and then deposited on the extending fingers 44″.

As the pairs of fingers 44″ approach and pass beneath the work surface 28, the consecutively stacked quantities of books are deposited thereon.

As may be most clearly seen in FIGS. 2 and 3, the second pair of side walls 38, 40 do not extend all the way to the work surface 28. To the contrary, the bottom edges thereof are a predetermined distance above such work surface. Such space is provided to permit the pusher or transport means 50 of the input feed mechanism 14 to pass through the enclosure 32 to deliver the stacked books 26 through the front knife assembly 20 and onto the work table 16. Although not specifically shown, walls 38, 40 may be adjustable relative to one another to vary the length of the enclosure 32.

INPUT FEED MECHANISM

Referring most specifically to FIG. 5, there is shown a detailed view of the input feed mechanism 14 and the manner in which it cooperates with the stacking mechanism 12 schematically represented by the lower portion of the side walls 38, 40 thereof. The purpose of the input feed mechanism is to transport the book 26, which has been deposited on the work surface 28 by the stacking mechanism 12, from its first position immediately beneath the stacking mechanism 12, through the front knife assembly 20, against the back stop, to its second position on the movable table 16.

To accomplish such movement there is provided the pusher 50 which is secured to the trolley 52 mounted on rollers 54 and 56. As will be further explained, in response to activation of the input feed driving mechanism, generally indicated at 58, the trolley 52 and pusher 50 carried thereby is movable on rollers 54 and 56 from the initial starting position shown in solid lines in FIG. 5 to a finishing position indicated by the dotted pusher 50′ in FIG. 5 whereby the book 26 will have been moved from beneath the stacking mechanism 12, through the front knife assembly 20, and onto the movable work table 16.

During its path of movement from its starting to finishing position thus defined, the trolley carrying rollers 54 and 56 are guided by an upper track or guide 60 such that although the trolley 52 and rollers 54, 56 are beneath the work surface 28, the pusher 50 extends up through the slot 61 (see FIG. 1) in the work surface 28 to engage and push the book 26.

As noted previously and as most clearly seen in FIG. 6, the front knife assembly includes a window frame 62 to permit the book 26 and pusher 50 to pass therethrough in depositing the book on the movable work table 16.

In order to facilitate the passage of book 26 through the window frame 62 of the front knife assembly 20 and to prevent its falling in the space which would otherwise be present between the front edge 64 of the word surface 28 (see FIG. 5) and the trailing edge 66 of the work table 16, there is provided a bridge 68 pivotally secured to the front surface 64 of the work surface 28.

As most clearly seen in the plan view of FIG. 1, the bridge 68 actually comprises a pivoting frame 70 provided with a break or opening 72 which permits the passage of pusher 50 therethrough. Frame 70 also includes a pair of straps or belts 74 upon which the book 26 will be guided in passing through the front knife assembly 20.

As will be most clearly explained with respect to the sequential sketches of FIGS. 5a, 5b and 5c, but as may also be seen in FIG. 5, the bridge 68 is movable in response to movement of a link 76 between an up position shown in solid lines in FIG. 5, in which position it bridges the space between the work surface 28 and the movable table 16, and a down position shown as dotted position 68' in FIG. 5, whereby as will be further described, the front knife assembly 20 may non-interferingly perform the trimming operation on the trailing edge 78 of the book 26 once the main transport clamp is bottoms thereon.

As the bridge 68 is being rotated to its downward position, the lever arm 80 securely mounted on the rotating pivot pin 82 rotates to its dotted line position 80' of FIG. 5 whereby the member 84 is raised such that the lever arm 86 pivotally pinned thereto at 88 in rotated to its solid line position in FIG. 5, consequently rotating a switch arm 90 from a down position shown in FIG. 5a to the solid line position shown in IFGS. 5, 5b and 5c.

As shown in FIG. 5, when the main transport clasp 18 bottoms on the book 26 and causes the link 76 and members secured thereto to rotate the switch 90 to the up position shown in FIG. 5, the trolley 52 has reached its rightmost point of travel in FIG. 5 such that the front wheel 56 thereof abuts the front surface 64 of the work surface 28. Consequently as the trolley is returned to its starting position shown at the left hand side of FIG. 5 under the influence of input feed driving mechanism 58, the front wheel 56 is guided by the under surface 92 into a second or lower track 94. Thus as the trolley 52 continues its rearward motion back toward its starting position, the pusher 50 is automatically lowered through the slot 61 of the work surface 28 to a position below that surface; and the trolley may be returned to its initial or starting position even while a second book 26 is being deposited above the returning trolley and pusher by the stacking mechanism 12. It becomes apparent therefore that the cooperation of the stacking mechanism and input feed mechanism inherently increases the capabilities of the instant invention by eliminating the time lag which would otherwise occur if the deposit of subsequent books had to wait for the pusher 50 to be returned through the containing enclosure 32 of the stacking mechanism 12.

Referring to FIGS. 5a, 5b and 5c, there is shown in schematic form the sequence of events described above. In FIG. 5a the switch 90 is in its down position and the trolley 52 and pusher 50 have been moved under the influence of input driving mechanism 58, not shown, to its finishing or extreme right position whereby the book 26 has been deposited on the table 16 with the trailing edge 78 thereof positioned within the front knife assembly for trimming thereof. Adjustable stop means, not shown are provided for accurately positioning the book 26 on the table 16. It should be noted that in FIG. 5a the bridge 68 is in its up position and hence bridges the gap between the work surface 28 and the table 16 to permit the book to cross therebetween. At this point the main transport clamp 18 is in its up or releasing position.

In FIG. 5b the main transport clamp 18 has been moved down to its clamping position, by mechanism to be further described, and in response to such movement the link 76 has rotated the bridge 68 to its down or non-interfering position while at the same time the movement of the bridge 68, through members 80, 84 and 86, has caused the switch 90 to be moved to its up position. FIG. 5b shows the trolley 52 starting back toward its initial position whereby the front wheel 56 thereof is just engaging the under surface 92 of the switch 90. Immediately after the bottoming of main transport clamp 18, the front knife clamp 96 and front knife blade 98 of front knife assembly 20 begin their downward motion, in a manner to be further described.

FIG. 5c shows the front knife blade 98 trimming the trailing surface 78 of the book 26, which, as noted before, is now made possible because the bridge 68 has been rotated to its down, non-interfering position. FIG. 5c also shows the front wheel 56 of the trolley 52 being guided by the lower track 94 such that the pusher 50 is returned toward its initial position beneath the surface 28 whereby the next book 26 may be deposited on such surface even while the pusher 50 is returning to its initial position.

Returning once more to FIG. 5, the operation of the input feed driving mechanism 58 will now be explained. Pivoted on the rear axle upon which rear wheel 54 of trolley 52 rotates is a generally L-shaped linking arm 100. For purposes which will be explained, there is provided a spring 102 biased to continually urge linking arm 100 away from trolley 52. Pivotally secured to arm 104 of linking arm 100 is the driving arm 106 of a bellcrank lever 108 which is mounted for pivotal rotation about fixed pivot point 110. Adjustably positionable within an arcuate slot 112 of the driven arm 114 of bellcrank lever 108 is one end of one member 116 of a releasable latching means 118, a second member 120 of which is pinned on one end 122 of a bifurcated cam follower lever 124 which is rotatable in both the clockwise and counter-clockwise rotation in response to rotation of a cam 128 mounted for rotation on an offset shaft 368. The two arms 126, 128 of cam follower 124, are joined by rods 368. Arms 126 and 128 include rollers 132 and 134, respectively, which are movable and guided by the inner and outer surfaces 136 and 138 of cam 128.

In operation, initial rotation of cam 128 by cam shaft 368 rotates cam follower 124 in the clockwise direction with respect to FIG. 5 which thereby rotates bellcrank lever 108 in a clockwise direction by means of the normally rigid releasable latching means 118. Clockwise rotation of bellcrank lever 108 causes the driving arm 106 thereof to pass through the three positions 108, 108' and 108" of FIG. 5 during which time the trolley 52 is moved from its initial to its finishing position by means of linking arm 100. It may be noted that as the bellcrank lever 108 is being rotated the linking arm 100 is urged against the bias of spring 102 toward the trolley 52.

When the trolley reaches its finishing position, the book has been deposited on the table 16, the main transport clamp 18 descends, and the bridge 68 and switch 90 are moved to their down and up position, respectively, as previously described.

Continued rotation of cam 128 now causes the surface 138 thereof to urge roller 134, arm 128 and the cam follower 124 in a counter-clockwise direction, which, through releasable latching means 118, causes the bellcrank lever 108 to reverse its direction and pass from position 108" through 108' and back to its initial position indicated at 108.

It will be appreciated that when bellcrank lever 108 occupies the center position 108' of FIG. 5, the L-shaped linking arm 100 has been urged toward trolley 52 against the bias of spring 102. The bias developed on spring 102 is utilized to return the front wheel 56 of trolley 52 to the upper track 60 in the following manner. As can be clearly seen in FIGS. 5, 5a–5c, there is provided an opening 140 in the intermediate surface 142 separating the upper and lower tracks 60 and 94. When the front wheel 56 of the trolley 52 reaches the opening 140 the bias developed on spring 102, which as noted before, tends to separate linking arm 100 and trolley 52, snaps the front wheel 56 back to the upper track 60 whereby it will be returned on the upper track to its initial position in FIG. 5.

In order to prevent damage to the parts of the input feed mechanism thus far described, the releasable latching means is designed to separate and provide a slip-type of linkage which prevents rotation of bellcrank lever 108 in the event of jamming of books on the surface 28, even though the cam 128 may still be rotating. To this end the second member 120 thereof includes a tapered trunk portion 144 having a recess 146 thereabout. The trunk portion fits into an interior cavity 148 of the first member 116, with member 116 including a circumferentially arranged detent shoulder 150 which fits into the recess 146 on the tapered trunk 144 of member 120. A garter spring 152 surrounds member 116 and continually urges the detent shoulder 150 into the recess 146.

In the event that a book jams in the machine, but the cam 128 is still rotating, the force exerted by such jammed book against the pusher 50 is greater than the force developed by garter spring 152, and the tapered trunk portion 144 of the member 120 is pulled out of the cavity 148 of member 116 to prevent the application of the force developed by cam follower 128 on the bellcrank lever 108. If during the continued rotation of cam 128 and the consequent counterclockwise rotation of cam follower 124, the jamming has been relieved, the tapered trunk portion 144 will be automatically reinserted (it never comes completely out) into the cavity 148 with the garter spring 152 automatically biasing the shoulder 150 into the recess 148. Thus the next cycle will be initiated without delay.

As a final note to the operation of the input feed driving mechanism, the releasable latching means 118, comprised of members 116 and 120, may be adjustably positioned anywhere along the arcuate slot 112 in the driven arm 114 of the bellcrank lever 108. It will be apparent that the further the pivot point 154 of member 116 is positioned toward the end 115 of the driven arm 114, the greater will be the rotation of bellcrank lever 108 and hence the further pusher 50 will eventually travel toward its outward position, the in position always remaining the same. Thus, with relatively simple adjustment, the input feed mechanism may be utilized with books of various widths.

All sub-assemblies of the instant invention are operated at cycle speed, in this case chosen as 100 r.p.m., capable therefore of trimming books at the rate of 100 units per minute. Furthermore, since all sub-assemblies are operated by cams controlled by the single power source all sub-assemblies will be inherently synchronized with respect to each other.

Although there has been described a preferred embodiment of this novel invention, many variations and modifications will now be apparent to those skilled in the art. Therefore, this invention is to be limited, not by the specific disclosure herein, but only by the appending claims.

What is claimed is:

1. Input feed mechanism for transporting a quantity of material from a first to a second position comprising:
a work surface upon which a quantity of material which is to be moved to a second position may be deposited at a first position;
transport means movable above said work surface from a starting to a finishing position for moving said quantity from said first to said second position;
guide means cooperating with said transport means for returning said transport means from its finishing to its starting position in a path of movement which lies beneath said work surface at least until said transport means passes said first position;
whereby another quantity of material may be noninterferingly deposited on said work surface at said first position before said transport means passes thereby on its return to its starting position;
said guide means comprising:
a first track for guiding said transport means above said work surface as it moves from its starting to its finishing position;
a second track spaced beneath said first track for guiding said transport means beneath said work surface as it moves from its finishing position back towards its starting position;
switch means normally positioned in a first position for permitting said transport means to be guided by said first track as it moves from its starting towards its finishing position, and movable to a second position for permitting said transport means to be guided by said second track as it moves from its finishing back toward its starting position;
said transport means including
a front and rear roller and a material engaging element carried thereby, said front roller being guided by said first track during movement of said transport means from its starting to its finishing position, and guided by said second track when said switch means is in its second position and said transport means is being returned from its finishing toward its starting position; said material engaging element being lowered beneath said work surface when said front roller is being guided by said second track.

2. The input feed mechanism of claim 1, and further including a linking arm pivotally secured to said rear roller and normally biased by biasing means away from said front roller and further including driving means for moving said transport means between its starting, finishing, and starting positions, said driving means including:
cam means rotatable in a first direction at a predetermined speed; and
pivoting bellcrank means linked to said cam means and rotatable in first and second directions in response to rotation of said cam means in its first direction, said pivoting bellcrack means including driving and driven arms, said driving arm being pivotally connected to said linking arm for movement of said transport means between its starting, finishing, and starting positions in response to rotation of said driven arm in its first and second directons, respectively, caused by rotation of said cam means in its first direction;
said linking arm being urged against the bias of said biasing means toward said front roller when said transport means is being moved between its starting, finishing, and starting positions in response to rotation of said driving arm in its first and second directions, respectively, caused by rotation of said cam means in its first direction.

3. The input feed mechanism of claim 2, wherein said second track includes means located between said starting position and said first position of said quantity of material for permitting said front roller to transfer from said second track to said first track under the influence of the biasing force of said biasing means as said transport means returns from said finishing position back toward said starting position.

4. The input feed mechanism of claim 1, and further including bridge means pivotally mounted on said work surface, said bridge means being movable between a first position parallel to said work surface whereby said quantity of material can be transported all the way to its second position and a second position transverse to said work surface whereby there is a predetermined space between said second position and said work surface.

5. Input feed mechanism for transporting a quantity of material from a first to a second position comprising:
- a work surface upon which a quantity of material which is to be moved to a second position may be deposited at a first position;
- transport means movable above said work surface from a starting to a finishing position for moving said quantity from said first to said second position;
- guide means cooperating with said transport means for returning said tranpsort means from its finishing to its starting position in a path of movement which lies beneath said work surface at least until said transport means passes said first position;
- whereby another quantity of material may be noninterferingly deposited on said work surface at said first position before said transport means passes thereby on its return to its starting position;
- driving means for moving said transport means between its starting, finishing, and starting positions, said driving means including:
    - cam means rotatable in a first direction at a predetermined speed;
    - cam follower means rotatable in first and second directions in response to rotation of said cam means in its first direction;
    - pivoting bellcrank means rotatable in first and second directions in response to rotation of said cam follower means in its first and second directions, respectively, said pivoting bellcrank means including driving and driven arms thereof, said driving arm being connected to said transport means for movement thereof between its starting, finishing, and starting positions in response to rotation of said driven arm in its first and second direction, respectively, caused by rotation of said cam follower means in its first and second direction, respectively; and
    - releasable latching means normally rigidly connected between said cam follower means and said driven arm of said pivoting bellcrank means for driving said driven arm when there is less than a predetermined amount of force opposing movement of said transport means and for releasing the rigid connection between said cam follower means and said driven arm when there is more than said predetermined amount of force opposing movement of said transport means.

6. The input feed mechanism of claim 5, wherein said releasable latching means includes:
- a first member pivotally secured to said cam follower means, said first member including a tapered trunk portion including a recess spaced therearound;
- a second member pivotally secured to said driven arm, said second member including an interior cavity for the reception of said tapered trunk portion of said first member, said interior cavity including detent shoulders at one end thereof which are normally received by said recess of said tapered trunk portion when said tapered trunk portion is inserted in said cavity; and
- spring means surrounding said second member for urging said detent shoulders into said recess, said spring means being of predetermined strength which will allow said first member to be pulled out of said cavity when a force greater than said predetermined amount opposes movement of said transport means.

7. The input feed mechanism of claim 5 wherein said releasable latching means is pivotally connected at first and second ends thereof to said cam follower means and said driven arm, respectively; and said second end of said releaseable latching means can be pivotally secured to said driven arm at preselected positions along its length, whereby the amount of movement of said transport means between its starting and finishing positions as determined by the amount of rotation of said driving arm can be increased or decreased by moving the second end of said releaseable latching means toward and away from a first end of said driven arm, respectively.

8. A delivery mechanism for delivering material from a first position to a second position comprising:
- a table upon which a quantity of material which is to be moved to a second position off said table from a first position on said table may rest, said table having a longitudinal slot extending along an upper surface thereof and including a substantially hollow interior communicating with said slot;
- delivery transport means movable above said upper surface from a starting to a finishing position for moving said material from its first to its second position;
- delivery operating means cooperating with said delivery transport means for returning said delivery transport means from its finishing to its starting position in a path of movement which passes through said hollow interior, out an end thereof, and up to its starting position above said upper surface;
- said delivery operating means including:
    - movable lever means connected at one end thereof to said delivery transport means, said movable lever means occupying a down position in which said delivery transport means is below the upper surface of said table when said delivery transport means is in its finishing position;
    - cam means blocking the path of movement of the other end of said movable lever means when said delivery transport means is being moved back toward its starting position for moving said delivery transport means to an up position which corresponds to said starting position; and
    - latching means for maintaining said lever means in its up position as said delivery transport means moves from its starting to its finishing position.

9. The delivery mechanism of claim 8 and further including unlatching means for defeating said latching means to allow said movable lever means to drop to its down position when said delivery transport means reaches its finishing position.

10. Input feed mechanism for transporting a quantity of material from a first to a second position comprising:
- a work surface upon which a quantity of material which is to be moved to a second position may be deposited at a first position;
- transport means movable from a starting position to a finishing position for moving said quantity from said first to said second position; and
- driving means for moving said transport means between its starting, finishing, and starting positions, said driving means including,
    - cam means rotatable in a first direction at a predetermined speed,
    - cam follower means rotatable in first and second directions in response to rotation of said cam means in its first direction,
    - pivoting bellcrank means rotatable in first and second directions in response to rotation of said cam follower means in its first and second directions, respectively, said pivoting bellcrank means including driving and driven arms thereof, said driving arm being connected to said transport means for movement thereof between its starting, finishing, and starting positions in response to rotation of said driven arm in its first and second direction, respectively, caused by rotation of said cam follower means in its first and second direction, respectively, and
    - releaseable latching means normally rigidly connected between said cam follower means and said driven arm of said pivoting bellcrank means for driving said driven arm when there is less than a predetermined amount of force opposing movement of said transport means and for releasing the rigid connection between said cam follower means and said driven arm when there is more than said predetermined amount of force opposing movement of said transport means.

11. The input feed mechanism of claim 10 wherein said releaseable latching means includes:
a first member pivotally secured to said cam follower means, said first member including a tapered trunk portion including a recess spaced therearound;
a second member pivotally secured to said driven arm, said second member including an interior cavity for the reception of said tapered trunk portion of said first member, said interior cavity including detent shoulders at one end thereof which are normally received by said recess of said tapered trunk portion when said tapered trunk portion is inserted in said cavity; and
spring means surrounding said second member for urging said detent shoulders into said recess, said spring means being of predetermined strength which will allow said first member to be pulled out of said cavity when a force greater than said predetermined amount opposes movement of said transport means.

12. The input feed mechanism of claim 10 wherein said releaseable latching means is pivotally connected at first and second ends thereof to said cam follower means and said driven arm, respectively; and said second end of said releaseable latching means can be pivotally secured to said driven arm at preselected positions along its length, whereby the amount of movement of said transport means between its starting and finishing positions as determined by the amount of rotation of said driving arm can be increased or decreased by moving the second end of said releaseable latching means toward and away from a first end of said driven arm, respectively.

13. In combination:
a work surface upon which a predetermined quantity of material which is to be moved to a second position may be deposited at a first position;
transport means normally movable above said work surface from a starting to a finishing position for moving said predetermined quantity from said first to said second position;
guide means cooperating with said transport means for returning said transport means from its finishing to its starting position in a path of movement which lies beneath said work surface at least until said transport means passes said first position;
whereby another quantity of material may be non-interferingly deposited on said work surface at said first position before said transport means passes thereby on its return to its starting position; and
mechanism for stacking said predetermined quantity of said material on said work surface at said first position, said mechanism including,
a containing enclosure positioned above said first position and including a first pair of side walls, each of which includes stacking means which cooperate to deposit said material on said surface, and a second pair of oppositely disposed walls transversely oriented with respect to said first pair and said surface, said second pair being spaced a predetermined distance from said work surface to permit said transport means to pass through said enclosure as it moves from its starting to its finishing position.

References Cited
UNITED STATES PATENTS 1,726,418   8/1929   Aldrich _____ 198—221

EDWARD SROKA, Primary Examiner